Oct. 25, 1955    C. O. PETERSON ET AL    2,721,780
OPEN-TOP RECORD FILING RECEPTACLES
Filed May 7, 1953    2 Sheets-Sheet 1

INVENTORS
Carl O. Peterson
BY Norman J. Spindler

ATTORNEY

Oct. 25, 1955  C. O. PETERSON ET AL  2,721,780
OPEN-TOP RECORD FILING RECEPTACLES
Filed May 7, 1953  2 Sheets-Sheet 2
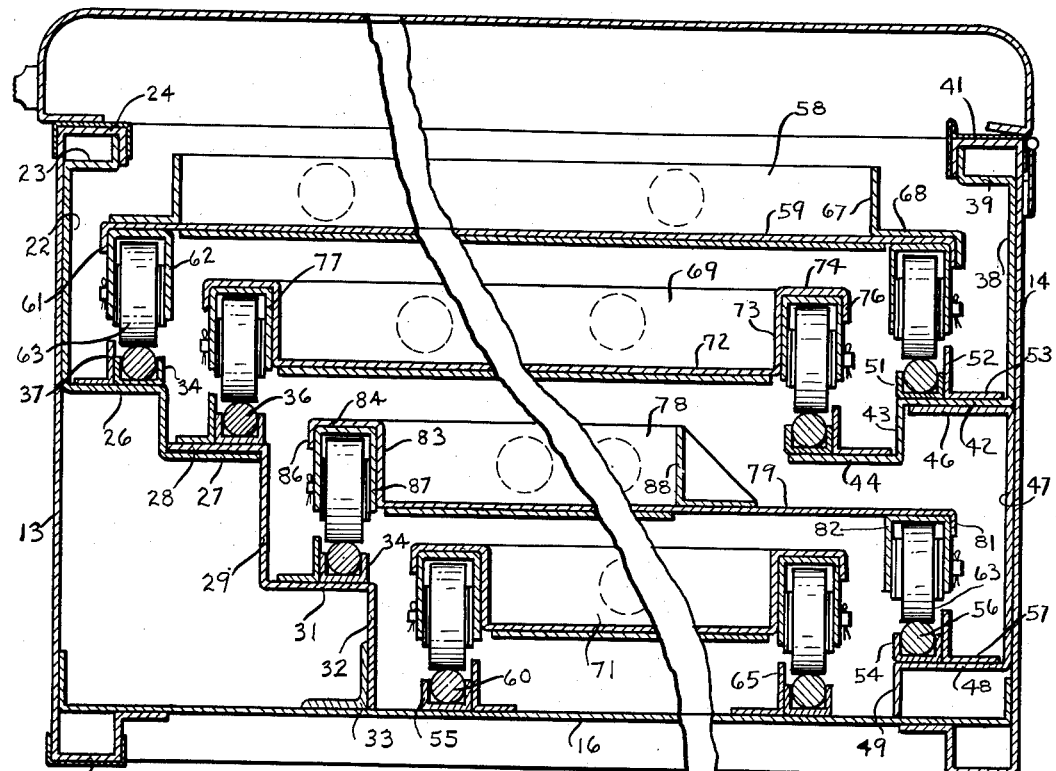
Fig. 4
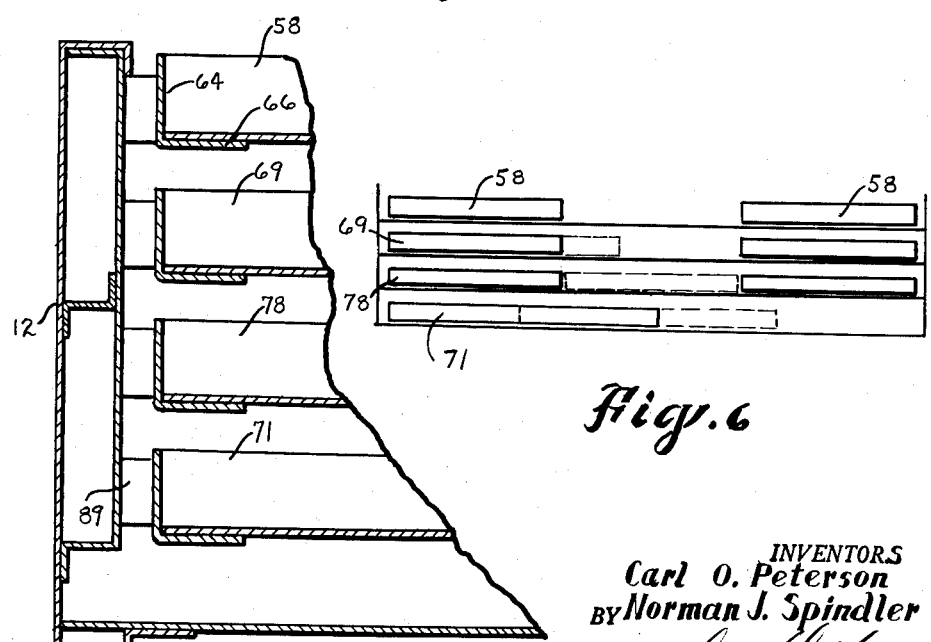
Fig. 5
Fig. 6
INVENTORS
Carl O. Peterson
BY Norman J. Spindler
ATTORNEY United States Patent Office 2,721,780
Patented Oct. 25, 1955

2,721,780

OPEN-TOP RECORD FILING RECEPTACLES

Carl O. Peterson and Norman J. Spindler, Jamestown, N. Y., assignors, by mesne assignments, to Chrysler Corporation, Highland Park, Mich., a corporation of Delaware Application May 7, 1953, Serial No. 355,484

5 Claims. (Cl. 312—304)

This invention relates to open-top receptacles of the type used to contain various card or sheet records and more particularly is directed to the provision of receptacles in which the entire record contents is readily accessible for examining, posting, and replacing.

Receptacles of this type are frequently found most suitable in the accommodation of records of a given subject, class, or group, such, for example, as government, insurance, and industrial records. Records of this type must be frequently processed and for accuracy, convenience, and the saving of time should, in their entirety, be fully viewable and accessible.

It is of course known that many and varied receptacles have heretofore been utilized to accommodate records and in many instances have adequately served such purposes. However, as agencies expand and businesses grow, an increasing number of receptacles are required to accommodate the additional records. Not infrequently, office space is at a premium and a serious problem develops as to where and how to locate and arrange a number of such receptacles so that they will enable easy access and yet not crowd or inconvenience other office or business operations.

The present invention is directed to and has for one of its objects the provision of an open-top receptacle that provides unusually large record accommodation in a given floor area.

Another object of the invention lies in the provision of full visibility of all records in the receptacle through the use of slidable, vertically stacked, record receiving trays.

A further object of the invention lies in the provision of an arrangement of record receiving trays within an open-top receptacle that enables an operator, from a fixed place of work, to examine and process any and all records within the receptacle.

Another and further object of the invention lies in the provision of a receptacle in which rollable support is provided for record receiving trays, the support being such that the contents of any tray may be examined and processed and the trays, as may be required, removed and replaced.

Other and further objects of the invention will be more clearly apparent from a consideration of the following specification, taken in conjunction with the accompanying drawings; in which Fig. 1 is a front elevational view of a record receiving receptacle embodying one form of the invention;

Fig. 4 is a greatly enlarged fragmentary view of the structure shown in Fig. 3 and discloses details of trays and rolling support therefor;

Fig. 5 is a greatly enlarged fragmentary vertical sectional view showing the end structure of the receptacle and trays, being taken substantially as indicated by the line 5—5 of Fig. 2; and Fig. 6 is a longitudinal vertical sectional view showing the disposition of trays within the receptacle.

Figure 1:
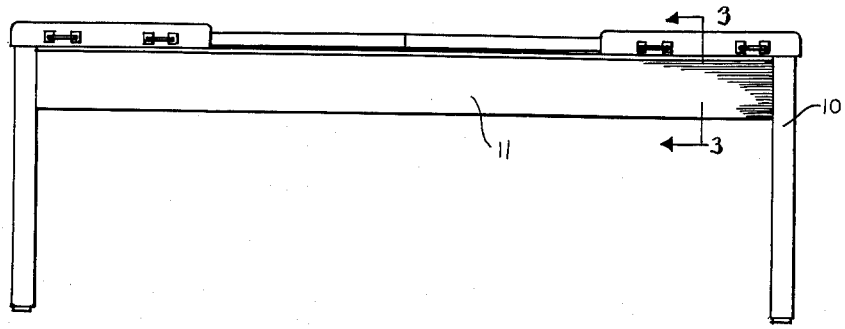
Figure 2:
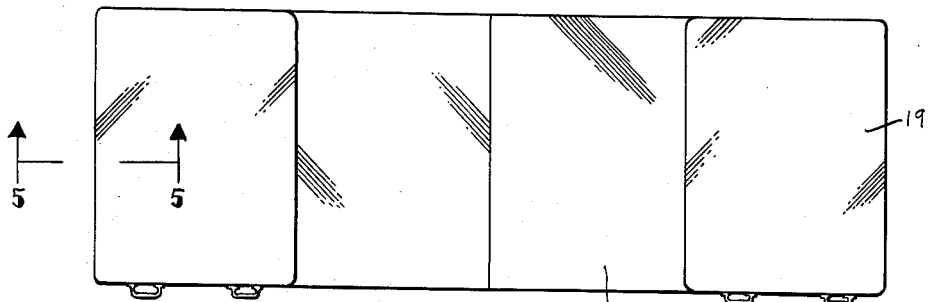
Fig. 2 is a top plan view of the receptacle shown in Fig. 1.
Figure 3:
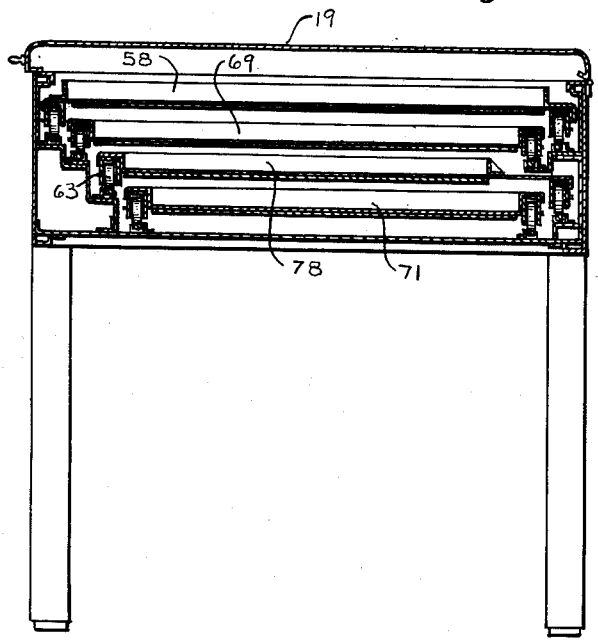
Fig. 3 is an enlarged, transverse, vertical, sectional view, being taken substantially on the line 3—3 of Fig. 1.

Referring more particularly to the drawings, the reference numeral 10 is employed to generally designate a receptacle in which the present invention is embodied. The receptacle, in the present showing, is in the form of a rectangular tub 11 that is formed with duplicate end walls 12 and front and rear walls 13 and 14. The base 16 of the receptacle may, as shown in the drawing, rest on and be secured to channels 17 formed along the lower edges of the front and rear walls. Attached to and depending from the corners of the base of the receptacle are supporting legs 18. These legs are of such length as to locate the top rim of the receptacle at a suitable height for convenient accessibility to the receptacle's interior by an operator. Although the present invention is not directly related to an open-top receptacle having one or more covers, the present disclosure does indicate a pair of end covers 19 and intermediate covers 21. The end covers may be so attached as to be movable to the rear of the receptacle in a manner to fully expose the end contents of the receptacle. It is contemplated that the intermediate covers 21 may be moved along the rim of the receptacle from one end to the other in order to expose the intermediate contents of the receptacle. These intermediate covers are also conveniently usable as work shelves.

Attached to the inner face of the front wall 13 is a plate 22 that extends substantially the full length of the receptacle. The upper edge of this plate is flanged, as suggested at 23, to interfit with and be secured to the inturned rim 24 of the wall 13. The plate 22 has inwardly set ledges that are formed by flanges 26 and 27. Resting on the lowermost flange 27 is a flange 28 of a further plate 29 and this plate in turn has an inwardly set ledge 31. From the ledge 31, this further plate depends in the flange 32 and abuts the bottom wall 16 of the receptacle. Any suitable means, such as brackets 33, may be provided to permanently join the flange 32 to the wall 16. It is to be noted that plates 22 and 29 combinedly form a series of three inwardly and downwardly stepped ledges. Mounted on each of these ledges is an upwardly opening channel 34. Each channel receives a rod 36. The rods are of a diameter to be exposed above the side walls of the channel to form tracks. Attached to the front wall of each of the channels 34 is an angle plate 37, the upstanding flange of which is of slightly greater height than the diameter of the rod 36 and such plates serve as guard rails for anti-friction rollers hereinafter more fully set out.

Attached to the upper, inner face of the rear wall 14 is a plate 38. The upper edge of this plate is flanged, as at 39, to interfit the inturned rim 41 formed at the rear of the receptacle. In the same plane with the flange 26, plate 38 is formed with a flange or ledge 42. Depending from the inner edge of this ledge is a flange 43 that terminates in a further inwardly and downwardly stepped ledge 44. Abutting the under face of flange 42 is a flange 46 of a further plate 47, this further plate being attached to the inner face of the rear wall 14. The lower edge of plate 47 is flanged inwardly to provide a ledge 48, from the inner edge of which depends a flange 49 that abuts the receptacle wall 16.

Attached to the upper face of the ledge 42 is an upwardly opening channel 51 which is identical with the previously mentioned channels 34. This channel receives a rod 52 that forms a track in similar fashion to the rods 36. Between the channel and the rear wall is an angle plate 53, the upstanding flange of which extends above the top surface of the rod 52. In like fashion, the flange or ledge 48 mounts a channel 54 which supports a further rod 56, similar in all respects to the rods 36 and 52. Adjacent the channel 54 is an angle plate 57 that is similar to the plate 53. Mounted on the base wall 16, adjacent to flanges 32 and 49, are channels 55 which accommodate rods 60, these rods being identical in length, diameter, and purpose with the previously mentioned rods 36, 52, and 56. The innermost flange of each channel 55 is abutted by an angle plate 65, this angle plate being identical in proportions and purpose with plates 37, 53, etc.

A series of record receiving trays are adapted to be mounted in the receptacle. These trays have been designed to be of certain proportions and arrangement in order that the greatest number of records possible may be contained in a given size receptacle and at the same time render the records fully accessible to an operator occupying a fixed position with respect to the receptacle. With this in mind, attention is now directed to the arrangement and structure of the trays. The present illustration of the invention contemplates the provision of a receptacle having a four-deep tray capacity. These trays are so arranged that they may be inserted and removed at will and may also be moved along their supports for full accessibility to an operator.

Reference is had for the moment to the diagrammatic showing in Fig. 6. This figure represents a longitudinal, vertical sectional view and shows a pair of top trays 58. These trays are each slightly less than one-third the interior length of the receptacle. As both of the trays shown are identical, only one of them will be described in detail. Tray 58 consists of a base wall 59 having front and rear depending flanges 61. Secured to the under face of the wall 59, adjacent the flanges 61, are brackets 62. These brackets serve to mount rollers 63. There will, of course, be at least four brackets and four rollers provided with each tray. Any increase over this number would only necessarily occur in the event the records to be contained are of greater than normal weight. The end walls 63 of the tray have horizontal flanges 66 that provide a seat for the ends of the base wall 59. The front and rear walls 67 have horizontal flanges 68 that rest on and are secured to the base wall. It will be noted that the rollers 63 rest on the rods 36 and 52 and that these rods provide an anti-friction track for the rollers. The plates 37 and 53 provide front and rear guards, respectively, for the rollers to prevent them from leaving the tracks during movement of the tray from one position to another, lengthwise of the receptacle. These guards are not of such height as to prevent lifting the tray, moving it slightly forwardly or rearwardly of the receptacle to permit its being tilted and withdrawn through the slightly narrowed top opening defined in part by rims 24 and 41.

A second level of two trays 69 is provided. These trays are also each slightly less than one-third the interior length of the receptacle. They are not of identical structure with trays 58, in view of the fact that their front edges must be slightly stepped back from the front edges of trays 58 for operator viewability, and also by reason of a necessary difference in location and arrangement of mounting structure by which the trays are enabled to move lengthwise of the receptacle. The bottommost tray 71 is preferably of a length slightly less than two-thirds the interior length of the receptacle. Except for this difference in length and a slight difference in width, trays 69 and tray 71 are of identical construction and will be referred to by the same reference numerals. Each of these trays is formed with a base wall 72 that, at its forward and rearward edges, is bent upwardly to provide front and rear walls 73. From the upper edges of these walls, horizontal flanges 74 extend forwardly and rearwardly and terminate in depending flanges 76. These walls of the tray, together with flanges 74 and 76, form shallow, downwardly opening pockets in which are located a number of brackets 77. These brackets, like the brackets 62 referred to above, mount additional rollers 63. The rollers associated with trays 69 rest on a second set of tracks 36, the rear tracks being mounted on the ledge 44. It will be observed that the angle plates 37 serve as guides to prevent mistracking of the rollers when the trays 69 are moved in the direction of the length of the receptacle. At this point, it is also to be noted that the trays 69 are narrower than trays 58 and in part nest with those trays, at least to the extent that they are located between the front and rear rollers of trays 58. The bottom tray 71, of course, is of still lesser width and in effect nests with trays 78 located thereabove in much the manner that trays 69 nest with trays 58.

Beneath the second level of trays 69, are third level trays 78. These trays, two in number, are also each slightly less than one-third of the interior length of the receptacle. The rolling support of these trays is slightly different from that of the other trays above described, in view of the necessity for the front wall, stepped arrangement of the trays and the rear edge support. Each tray 78 includes a base wall 79 which, at its rearmost edge, terminates in a depending flange 81. Brackets 82 are secured to the under surface of the base of this tray adjacent flange 81, and mount additional rollers 63. The front wall 83 of each tray continues in horizontal and vertical flanges 84 and 86 to provide a shallow pocket for brackets 87. These brackets in turn mount additional rollers 63. The rear walls 88 of these trays cannot be located adjacent the rear edge of the base wall 79, due to proximity of the ledge 44 and, therefore must be set inwardly and will generally take the form and location shown in the drawings. The end walls of these trays are substantially identical with the end walls of the trays previously described. It will be noted that the front rollers ride on tracks 36, located considerably above track 56 provided for the rear rollers. However, this stepped arrangement of tracks and the location of the rear walls 88, enables insertion and removal of the trays as may be required.

For a clearer understanding of the advantages of the invention, a brief discussion of the installation of the trays and their manipulation is set forth. It may be assumed that the receptacle is empty. The lowermost tray 71 may, of course, be readily set into place with the rollers 63 thereof resting on tracks 60. Due to the structural support for the trays 78, they must be installed in the following manner. The lowermost tray 71 is moved to one end of the receptacle. One of the trays 78 is placed in the receptacle at the opposite end from tray 71, the rollers 63 thereof resting on tracks 36 and 56. This tray 78 is then moved lengthwise of the receptacle to a position over tray 71, and the second tray 78 is installed in like manner. Following this, trays 69 may be placed in the receptacle and, finally, the topmost trays 58. Inasmuch as it is contemplated that in use the trays will be frequently moved one end of the receptacle to the other, suitable sound deadening bumpers 89 are provided at each end of all of the trays.

Attention is directed particularly to the diagrammatic showing in Fig. 6. It will be noted that the smaller trays 58, 69, and 78, in solid lines, occupy positions at opposite ends of the receptacle, thus providing a three-tiered well, downwardly of the receptacle, and giving full viewability to the bottommost tray 71. It is obvious, of course, that the tray 71 must be moved along its tracks to enable viewing the entire contents thereof, and Fig. 4 of the drawing indicates that by reason of the step-back of tray 71, the entire contents will be viewable by reason of the end positioning of the superposed trays. It will also be apparent that any of the three sets of trays 58, 69, and 78 may be selectively moved to a central position with respect to the length of the receptacle. Thus, an operator stationed centrally of the receptacle, has ready and easy access and view of any of the records carried by the various trays. By reason of the stepped arrangement of the trays, together with the provision of multiple trays on each level, and increased quantity of records may be contained in a receptacle of given lateral dimensions.

Although applicants have shown and described only one form of the invention, it will be apparent that variations in the structure may be made in adapting the trays for use with various types and kinds of records and that such variations are contemplated as being part of the invention insofar as they are within the spirit and scope of the annexed claims.

Having thus set forth my invention, what I claim as new and for which I desire protection by Letters Patent is:

1. A box-like receptacle having a top access opening of substantial proportions, a series of stepped ledges interiorly arranged adjacent the front and rear side walls of said receptacle, said ledges extending substantially the full interior length of said receptacle, the stepped ledges adjacent one of said side walls being progressively stepped inwardly from the top downwardly and the topmost pair of ledges adjacent the other side wall being progressively stepped inwardly from the top downwardly, and the lowermost ledge adjacent the other side wall underlying the topmost pair of ledges adjacent said other side wall, tracks carried by said ledges, a pair of trays mounted for movement along the topmost tracks, said trays being of a length to enable selective movement along said tracks to a centered position with respect to the length of said receptacle, a bottom tray mounted for movement along the lowermost tracks, said bottom tray being movable into a central position whereby access thereto may be had when said pair of trays occupy positions at opposite ends of said receptacle, and further trays mounted for movement along intermediate tracks, said further trays being of a length to enable selective movement into a centered or endmost position with respect to said receptacle.

2. A box-like receptacle having a top access opening of substantial proportions, four pairs of superposed tracks extending the full interior length of said receptacle, corresponding tracks of said four pairs being progressively spaced inwardly from one of the side walls of said receptacle, the other tracks of the topmost two pairs of tracks being progressively spaced inwardly from the other side wall of the receptacle, and the other tracks of the lowermost two pairs of tracks underlying the said other tracks of the topmost two pairs of tracks and being progressively spaced inwardly from the other side wall of the receptacle, a pair of trays mounted for movement along the topmost pair of tracks, said trays each being of a length to enable selective movement to a central position with respect to the length of said receptacle, a second pair of trays mounted for movement along the second pair of tracks, said second pair of trays being of corresponding length and operativeness with the first mentioned trays, a third pair of trays mounted for movement along the third pair of tracks, said third pair of trays being of corresponding length and operativeness with the first mentioned trays, and at least one tray mounted for movement along the bottom pair of tracks.

3. A box-like receptacle having a top access opening of substantial proportions, four pairs of superposed tracks extending the full interior length of said receptacle, the front track of each of said pairs being successively stepped inwardly from the front wall of said receptacle, the rear track of the topmost two pairs of tracks being successively stepped inwardly from the rear wall of the receptacle, and the rear tracks of the lowermost two pairs of tracks underlying the said rear tracks of the topmost two pairs of tracks and being successively stepped inwardly from the rear wall of the receptacle a pair of trays mounted for movement along the topmost pair of tracks, said trays each being of a length to enable selective movement to a central position with respect to the length of said receptacle, a second pair of trays mounted for movement along the second pair of tracks, said second pair of trays being narrower but having the same operativeness as the first mentioned trays, a third pair of trays mounted for movement along the third pair of tracks, said third pair of trays being narrower than said second pair of trays and having corresponding operativeness with the first mentioned trays, and at least one tray mounted for movement along the bottom pair of tracks.

4. A box-like receptacle having a top access opening of substantial proportions, four pairs of superposed tracks extending the full interior length of said receptacle, the front track of each of said pairs being successively stepped inwardly and downwardly from the top of the front wall of said receptacle, the rear track of the topmost two pairs of tracks being successively stepped inwardly and downwardly from the top of the rear wall of the receptacle, and the rear tracks of the lowermost two pairs of tracks underlying the said rear tracks of the topmost two pairs of tracks and being successively stepped inwardly and downwardly from the rear wall of the receptacle, a pair of trays mounted for movement along the topmost pair of tracks, said trays each being of a length to enable selective movement to a central position with respect to the length of said receptacle, a second pair of trays mounted for movement along the second pair of tracks, said second pair of trays being narrower but having the same operativeness as the first mentioned trays, a third pair of trays mounted for movement along the third pair of tracks, said third pair of trays being narrower than said second pair of trays and having corresponding operativeness with the first mentioned trays, and at least one tray mounted for movement along the bottom pair of tracks, and bumper means mounted on the ends of the several trays.

5. A box-like receptacle having a top access opening of substantial proportions, a series of stepped ledges interiorly arranged adjacent the front and rear side walls of said receptacle, said ledges extending substantially the full interior length of said receptacle, the stepped ledges adjacent one of said side walls being progressively stepped inwardly from the top downwardly and the topmost pair of ledges adjacent the other side wall being progressively stepped inwardly from the top downwardly, and the lowermost ledge adjacent the other side wall underlying the topmost pair of ledges adjacent said other side wall, a pair of trays mounted for movement along the topmost ledges, said trays being of a length to enable selective movement along said ledges to a centered position with respect to the length of said receptacle, a bottom tray mounted for movement along the lowermost ledges, said bottom tray being movable into a central position whereby access thereto may be had when said pair of trays occupy positions at opposite ends of said receptacle, and further trays mounted for movement along intermediate ledges, said further trays being of a length to enable selective movement into a centered or endmost position with respect to said receptacle.

References Cited in the file of this patent

UNITED STATES PATENTS

| | | |
|---|---|---|
| 2,271,802 | Nordskog | Feb. 3, 1942 |
| 2,299,763 | Ottenheimer | Oct. 27, 1942 |